APPARATUS FOR PROJECTING MULTIPLE SUPERPOSED IMAGES

Filed Feb. 26, 1959

INVENTORS
CLAUDE M. FREDERICK, JR.
AND GRACE VOSS FREDERICK
BY
[signature]
ATTORNEY May 29, 1962 C. M. FREDERICK, JR., ETAL 3,036,496

APPARATUS FOR PROJECTING MULTIPLE SUPERPOSED IMAGES

Filed Feb. 26, 1959 6 Sheets-Sheet 2

INVENTORS
CLAUDE M. FREDERICK, JR.
AND GRACE VOSS FREDERICK
BY
[signature]
ATTORNEY.

APPARATUS FOR PROJECTING MULTIPLE SUPERPOSED IMAGES

Filed Feb. 26, 1959

6 Sheets-Sheet 3

INVENTORS
CLAUDE M. FREDERICK, JR.
AND GRACE VOSS FREDERICK
BY
[signature]
ATTORNEY.

INVENTORS
CLAUDE M. FREDERICK, JR.
AND GRACE VOSS FREDERICK
BY
[signature]
ATTORNEY.

INVENTORS
CLAUDE M. FREDERICK, JR.
AND GRACE VOSS FREDERICK
BY
Alvin Sinderbrand
ATTORNEY.

APPARATUS FOR PROJECTING MULTIPLE SUPERPOSED IMAGES

Filed Feb. 26, 1959

INVENTORS
CLAUDE M. FREDERICK, JR.
AND GRACE VOSS FREDERICK
BY
[signature]
ATTORNEY.

United States Patent Office 3,036,496
Patented May 29, 1962

3,036,496

APPARATUS FOR PROJECTING MULTIPLE SUPERPOSED IMAGES

Claude M. Frederick, Jr., and Grace Voss Frederick, both of 434 E. 59th St., New York, N.Y.

Filed Feb. 26, 1959, Ser. No. 795,638
13 Claims. (Cl. 88—24)

The present invention relates generally to apparatus for projecting multiple, superposed images, and this application is a continuation-in-part of our copending application Serial No. 520,205, filed July 6, 1955, and now abandoned.

Television stations, both large and small, prosper through the appeal of their programs enhanced by effective staging, and by the appeal of their commercials after the audience has been attracted.

The present means of "live" advertising which the smaller television stations, and sometimes the big stations, employ for the sake of immediacy is on the whole static, especially when compared with the commercial films used for advertising in which varied and animated effects, changing every few seconds or less, captivate the attention and hold the eye of the viewer. However, these commercial films are extremely costly to produce.

The smaller local advertiser, from whom much of the income of any station is derived, finds it unprofitable, considering his small audience, to invest in such an expensive type of advertising, so that his product's presentation suffers in comparison with the films of the nationally advertised brands of large producers which can afford the cost of filmed commercials, thereby making it more difficult for a local television station to sell its advertising service to local prospects and less appealing to the local consumer to buy the local products advertised. Even if the advertiser and the station are in a financial position to have the commercial films produced, such films are too inflexible and too time consuming in production to advertise the daily and weekly specials and to make possible the frequent changes of displays, written advertising matter, and prices necessary for the promotion of the products of the small advertiser. Accordingly, it is an object of the invention to provide a multiple optical projection apparatus in combination with a special effects and display stage whereby effects similar to those produced on film can be obtained less expensively and can be prepared in infinitely shorter time with the added advantage of permitting the flexible displaying of the actual products to be advertised, which may be shown with controlled and varied motions surrounded with special effects pertinent to the product, and combined with projected atmospheric backgrounds, moving and dubbed in written material and constant change and action.

The foregoing effects require the use of a plurality of projectors operative to provide multiple, superposed images on a screen or the like forming a part of the special effects and display stage, with each projector being equipped to accommodate either fixed or movable transparencies so that, through the medium of the relatively movable transparencies, the projected images can be given the appearance of being in motion, and also, through the clearing and/or opaquing of sections of the fixed and/or movable transparencies, multiple images can be made to pass over or behind each other.

Although previous attempts have been made at providing a plurality of projectors for simultaneously projecting superposed images on a common area of a screen or the like, such projectors have been arranged with their projection axes converging to a common point at the center of the screen, and thereby produced distorted images. Thus, if identical transparencies are provided in two or more of the projectors of the existing apparatus, the resulting images will not register on the screen and this makes it impossible to obtain many of the desired effects.

Accordingly, it is another object of the invention to provide an apparatus for projecting multiple, superposed images from a plurality of projectors against a common area of a screen or the like while avoiding any distortion of such images.

A further object of the invention is to provide an apparatus for projecting multiple, superposed images, and wherein the arrangement of such apparatus and the location of its controls are such as to permit the convenient operation of the apparatus by a single person.

In accordance with an aspect of the invention, apparatus for projecting multiple, superposed images includes a plurality of vertically arranged projectors each having a light source, a condenser lens system, an objective lens system and a reflector for directing light from the source through the condenser and objective lens systems, with the objective lens system and the light source and reflector of at least the top and bottom projectors being vertically movable in opposite directions relative to the condenser lens system so as to be displaced from the optical axis of the latter. Further, in the apparatus embodying the invention, the optical axes of the several condenser and objective lens systems are all parallel, and devices are provided for supporting transparencies in front of the condenser lens systems. Thus, for example, when the apparatus includes three vertically arranged projectors, the light source, reflector and objective lens system of the middle projector are axially aligned with the optical axis of the related condenser lens system for projection along the primary axis of the optical system which is arranged perpendicular to the screen upon which the image is to be produced, while the reflectors, light sources and objective lens systems of the top and bottom projectors are vertically displaced with respect to the optical axes of the related condenser lens systems thereby to project along secondary axes of the optical systems which intersect the plane of the screen at the point of intersection between the primary axis of the optical system of the middle projector and the plane of the screen, whereby distortion is avoided in the images produced on the screen by the top and bottom projectors.

In accordance with another important feature of the invention, each vertically movable light source and associated reflector is mounted, as a unit, for swinging about a horizontal axis so that, upon vertical displacement of the light source relative to the condenser lens system, the associated reflector will be angularly disposed for directing the maximum amount of light through the condenser and objective lens systems, thereby to provide a relatively bright image on the screen.

In accordance with still another aspect of the invention, each vertically movable light source and reflector is displaced automatically in response to the forward and rearward movement of the related objective lens system during focusing of the projected image on the screen so that the vertical displacement of the light source and reflector above or below the optical axis of the condenser lens system will automatically be that necessary to achieve the registration of the projected image with the images projected on to the screen by the other projectors of the apparatus.

The above, and other objects, features and advantages of the invention, will be apparent in the following detailed description of an illustrative embodiment thereof which is to be read in connection with the accompanying drawings, forming a part hereof, and wherein.

Figure 1:
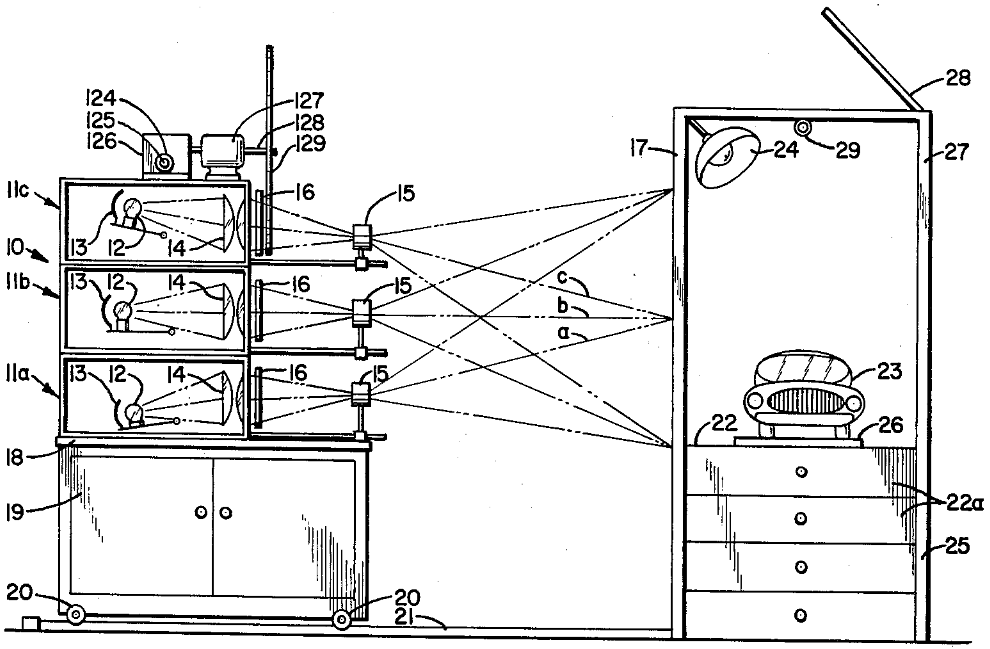
FIG. 1 is a diagrammatic side elevational view of an apparatus for projecting multiple, superposed images combined with a special effects and display stage.

Referring to the drawings in detail, and initially to FIG. 1 thereof, it will be seen that the apparatus for projecting multiple, superposed images in accordance with the present invention is there generally identified by the reference numeral 10 and includes a bottom projector unit 11A, a middle projector unit 11B and a top projector unit 11C arranged in a vertical stack and each having an optical system made up of a light source 12 with an associated reflector 13, a condenser lens assembly or system 14, an objective lens assembly or system 15 and a transparency carrier 16, with the optical systems of the three projector units 11A, 11B and 11C being related, as hereinafter described in detail, so that when identical transparencies are mounted in the respective carriers and projected onto a screen 17, the resulting images will be in superposed registry on the screen.

The projecting apparatus 10 is preferably mounted on a platform 18 which may conveniently be the top of a cabinet 19 serving as a storage space for the various transparencies to be used. The cabinet 19 may be provided with rollers or wheels 20 movable along tracks 21 for moving the projecting apparatus, as a unit, toward and away from the screen 17. The screen 17 may suitably form the background of a miniature stage 22 upon which any fixed or movable object 23 may be positioned for display in conjunction with the subject matter projected from the rear onto the screen 17. The display object or objects may be suitably illuminated by a lighting fixture 24. The stage 22 is preferably in the form of a removable flooring which may be mounted on the top of a cabinet 25 within which a plurality of exchangeable floorings, each in the form of a slide or drawer 22*a* may be stored, with each flooring being equipped with a different type of movement or effect, such as, for example, a turntable, conveyor belt, fountain, bubble and smoke maker or the like, operable by a motor (not shown) mounted in cabinet 25. In the arrangement shown in FIG. 1, the movable object 23 is mounted on a turntable 26 forming a part of the flooring or stage 22 and being remotely controllable through suitable means by a projectionist stationed at the projecting apparatus 10. Mounted on the miniature stage 22 is an open framework 27 which, at the top thereof, supports an inclined mirror 28 through which the projectionist may observe the mechanical effects produced on the stage. The framework 27 may also support one or more pipes 29 having discharge openings through which water may be sprayed in order to produce rain or shower effects under the remote control of the projectionist. The above described combination of the projecting apparatus 10 and the miniature stage 22 with a screen 17 and other appurtenances may be used in a television studio for telecasting by a video camera (not shown) disposed at the side of the stage 22 remote from the projecting apparatus.

Since the objective lens assemblies 15 of the projector units 11A, 11B and 11C are necessarily spaced apart, it is apparent that the images projected by such units can occupy a common area on the screen 17 only if such images are projected along axes which converge to a point at the plane of the screen. If all of the projector units projected along the primary axes of the respective optical systems, the necessary convergence of the projection axes would be obtained by tilting the bottom unit 11A upward toward the screen 17 and by tilting the top unit 11C downwardly toward the screen, while the primary axis of the optical system of the middle unit 11B remains horizontal. However, in that case, the images projected by the bottom and top units 11A and 11C would be distorted on the screen 17 and, in the event that two or more of the units projected images of identical transparencies, as would be necessary in achieving certain effects, such images would not be in superposed registry on the screen. In accordance with the present invention, the distortion of the images projected along axes which are not perpendicular to the plane of the screen 17 is avoided by vertically displacing the light source 12 and associated reflector 13 and the objective lens assembly 15 relative to the condenser lens assembly 16 of each projector unit thus involved in order to project along a secondary axis of the optical system so that, while the portion of the secondary axis extending from the objective lens assembly is inclined relative to the horizontal, and therefore not perpendicular to the vertical plane of the screen 17, the projected image in any vertical plane is a true or accurate image of the related transparency.

By way of example, in the apparatus 10 of FIG. 1, the optical axes of the condenser and objective lens assemblies 14 and 15 of the middle unit 11B extend horizontally and are coincident, while the light source 12 is disposed on such optical axis so that the middle projector unit projects an image of the related transparency along the primary axis of the optical system extending horizontally, that is, perpendicular to the vertical plane of the screen 17. While the optical axes of the condenser and objective lens assemblies 14 and 15 of the bottom and top projector units 11A and 11C are also horizontal, it will be seen that the objective lens assemblies 15 of the bottom and top units are displaced upwardly and downwardly, respectively, relative to the corresponding condenser lens assemblies 14, and that the light sources 12 of the bottom and top projector units are displaced downwardly and upwardly, respectively, relative to the optical axes of the corresponding condenser lens assemblies.

By reason of the fact that the optical axes of the condenser and objective lens assemblies 14 and 15 of the bottom and top projector units are in parallel, spaced apart relationship and extend perpendicular to the plane of the screen 17, the projection axes of the optical systems of such units have portions *a* and *c*, respectively, extending from the related objective lens assemblies and converging to a point in the vertical plane of the screen 17 where the latter is intercepted by the optical axis *b* of the optical system in unit 11B. The absence of distortion of the images projected by the units 11A and 11C results from the fact that, while having projection axes which converge toward the screen, the optical systems of units 11A and 11C have the condenser and objective lens assemblies thereof arranged with their optical axes perpendicular to the plane of the screen. Further, as a result of the vertical displacements of the light sources 12 in units 11A and 11C, as described above, the maximum amount of light is provided for projecting the images in the directions along the projection axes which are secondary axes of the optical systems.

Referring now to FIGS. 3 to 10, inclusive, it will be seen that, in the constructional embodiment of the invention there illustrated, the projector units 11A, 11B and 11C of the apparatus 10 are formed as separable entities which are merely stacked one upon the other. The formation of the projector units as separable entities greatly facilitates the transportation and storage of the projection apparatus, and increases the reliability of the apparatus in meeting production schedules, in that, upon a defect or failure occurring in a component of one of the projector units, the latter can be replaced as a whole without taking the time necessary for effecting the necessary repairs. Further, the flexibility of the projection apparatus is improved, in that two or more of the projector units may be vertically stacked, or the projector units may be removed from each other and employed as conventional transparency projectors in order to achieve any desired effects. Although the projector units 11A, 11B and 11C are formed as separable entities for the foregoing reasons, it is to be understood that such units may form permanently joined together parts of the projection apparatus 10 within the scope of the invention.

The several projector units 11A, 11B and 11C are generally similar to each other, with the important exceptions to be noted below, and reference to FIGS. 3 to 7, inclusive, will show that the bottom unit 11A includes a housing having top and bottom, horizontal frame members 30 and 31 at the opposite sides of the housing, and front and rear vertical frame members 32 and 33 joining together the adjacent ends of the horizontal frame members 30 and 31. Further, the housing of the projector unit includes a suitably apertured front wall 34 secured to the frame members 32, and a rear wall 35 secured to the frame members 33. Additional horizontal frame members 36 are disposed immediately above the frame members 31 at the opposite sides of the housing and are secured, at their opposite ends, to the vertical frame members 32 and 33. Suitable removable side walls (not shown) of perforated metal are intended to be mounted on the frame members 30 and 31 in order to shield the operator of the apparatus from the glare of the light sources 12 while permitting adequate ventilation for dissipation of the heat.

Parallel, spaced apart horizontal guide rods 37 extend along the bottom of the housing and are fixedly mounted in blocks 38 and 39 secured to the lower portions of front wall 34 and rear wall 35, respectively. The guide rods 37 extend a substantial distance beyond the front wall 34 and, at their forward ends, are secured to a cross member 40. The structural rigidity of the guide rods 37 is increased by parallel outer bracing rods 41 which, at their forward ends, are also secured to the cross member 40, and which are suitably secured to angle members 42 projecting downwardly from the bottom of the housing, at the opposite sides of the latter, to form an elevated base for the housing.

The condenser lens assembly 14 of the bottom projector unit 11A includes a pair of condenser lenses 43 suitably secured to mounting plates 44 having their opposite side edges slidably received in vertical channel members 45 which are secured, at their upper and lower ends, to the frame members 30 and 36 at locations immediately in back of front wall 34.

Figure 4:
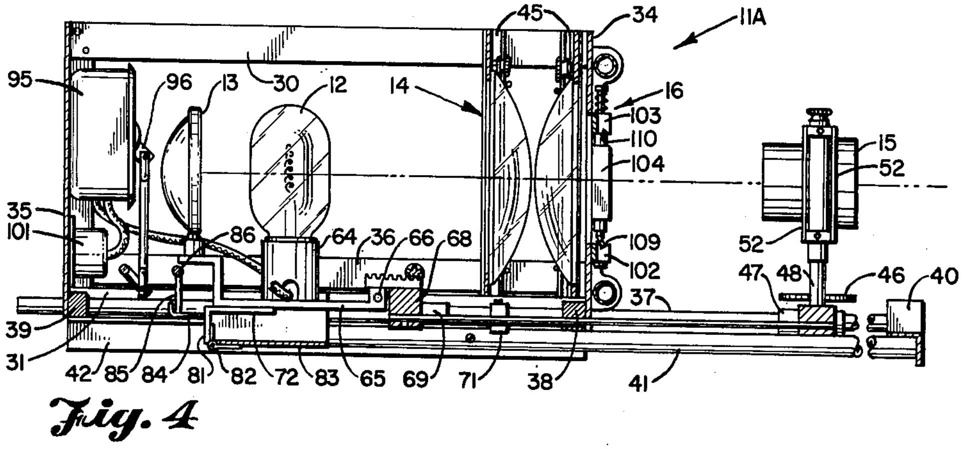
FIG. 4 is a longitudinal sectional view of the bottom projector unit included in the apparatus of FIG. 3.
Figure 5:
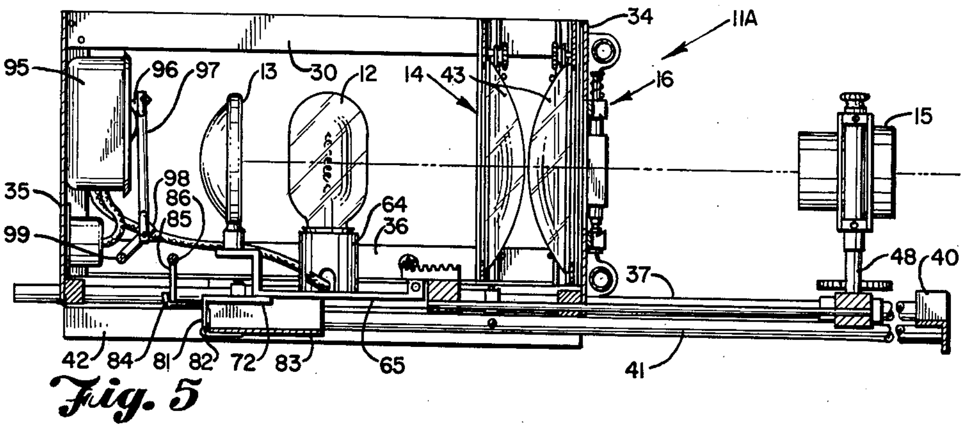
FIG. 5 is a view similar to that of FIG. 4, but showing the projector unit in another adjusted position.
Figure 17:
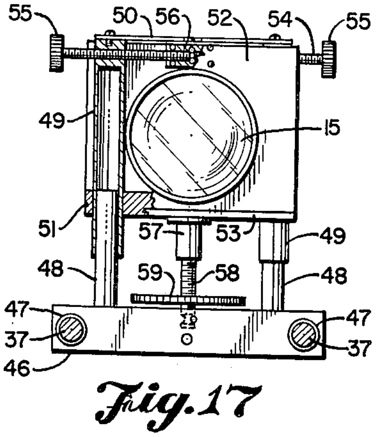
FIG. 17 is a front elevational view, partly broken away and in section, of the structure supporting the objective lens system in each of the top and bottom projector units.
Figure 18:
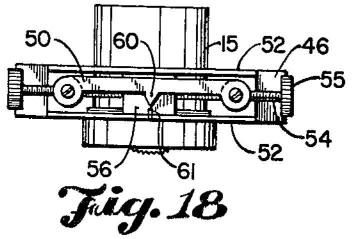
FIG. 18 is a top elevational view of the structure appearing in FIG. 17.

In accordance with the invention, the remaining elements of the optical system, that is, light source 12, reflector 13 and objective lens assembly 15, are mounted on the guide rods 37 for simultaneous movement along the latter during focusing of the optical system for projecting an image on the screen 17 at a particular distance from the projection apparatus 10. As shown in FIGS. 4, 17 and 18, the mounting structure for the objective lens assembly 15 of bottom projector unit 11A includes a cross member 46 having parallel tubular bearings 47 which are slidable along the guide rods 37. Uprights 48 extend from cross member 46, and tubular supports 49 are vertically slidable on the uprights. A cross piece 50 is secured, at its opposite ends, to the tops of supports 49, and a lower cross piece 51 is spaced downwardly from cross piece 50 and also secured, at its opposite ends, to the supports 49 so that the supports 49 and cross pieces 50 and 51 are movable vertically, as a unit, with respect to cross member 46. Spaced apart vertical plates 52 are disposed in front and in back of the supports 49 and have their lower edges slidably resting on guides 53 (FIG. 17) formed on the cross piece 51. An adjusting screw 54 having knobs 55 at its opposite ends is threaded through suitably tapped bores in the upper end portions of supports 49 and, at its center, is rotatably mounted in a block 56 secured between the plates 52 so that, when the adjusting screw 54 is rotated, and thereby displaced laterally with respect to the supports 49, the block 56 and plates 52 undergo the same lateral displacement. The objective lens assembly 15 is suitably secured in openings formed in the plates 52 for movement laterally with such plates. Further, an internally tapped, downwardly opening tube 57 depends centrally from cross piece 51 and threadably receives a vertical adjusting screw 58 which is rotatably mounted, at its lower end, in cross member 46 and provided with an actuating knob 59 by which the screw 58 may be rotated in order to effect the vertical displacement of the objective lens assembly 15. As shown in FIG. 18, the top cross piece 50 may be provided with a pointer 60 cooperating with an index 61 extending from one of the plates 52 in order to indicate the central position of the plates 52 and of the optical axis of the objective lens assembly 15 with respect to the laterally fixed structure of the projector unit.

It is to be noted that at least two of the projector units are provided with a mounting structure for the objective lens assemblies 15 thereof which is of the kind described above with respect to the bottom projector unit 11A, whereas the remaining projector unit may have a mounting for its objective lens assembly which merely permits vertical adjustment of the latter. Thus, in the illustrated projection apparatus 10, the bottom and top projector units 11A and 11C have a mounting structure for their objective lens assemblies which permit both lateral and vertical adjustment of the objective lens assemblies, as shown in FIGS. 17 and 18, whereas the mounting structure for the middle projector unit 11B may be of the kind illustrated in FIG. 16.

Figure 16:
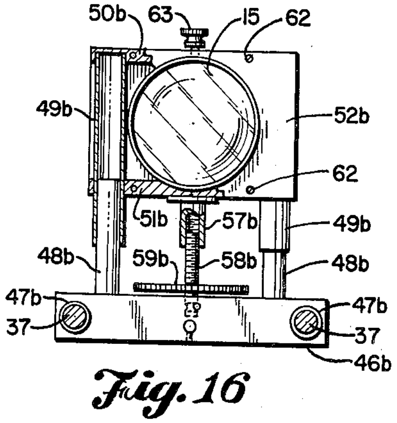
FIG. 16 is a front elevational view, partly broken away and in section, of the structure supporting the objective lens system included in the middle projector unit.

In the mounting structure of FIG. 16, the tubular supports 49*b* are once again vertically slidable on the uprights 48*b* projecting from the cross member 46*b* which is slidably mounted on the guide rods 37 of projector unit 11B by way of tubular bearings 47*b*, and top and bottom cross pieces 50*b* and 51*b* extend between supports 49*b* for movement, with the latter, as a unit, in response to rotation of the adjustment screw 58*b* by way of the knob 59*b* so as to vertically displace the internally threaded tube 57*b* depending from the bottom cross piece 51*b*. However, the plates 52*b* of the mounting structure are fixedly secured, by way of screws 62, to the cross pieces 50*b* and 51*b*, while the objective lens assembly 15 of the middle projector unit is retained within the accommodating openings of the plates 52*b* by way of a set screw 63 passing downwardly through a tapped opening in the top cross piece 50*b*.

Figure 6:
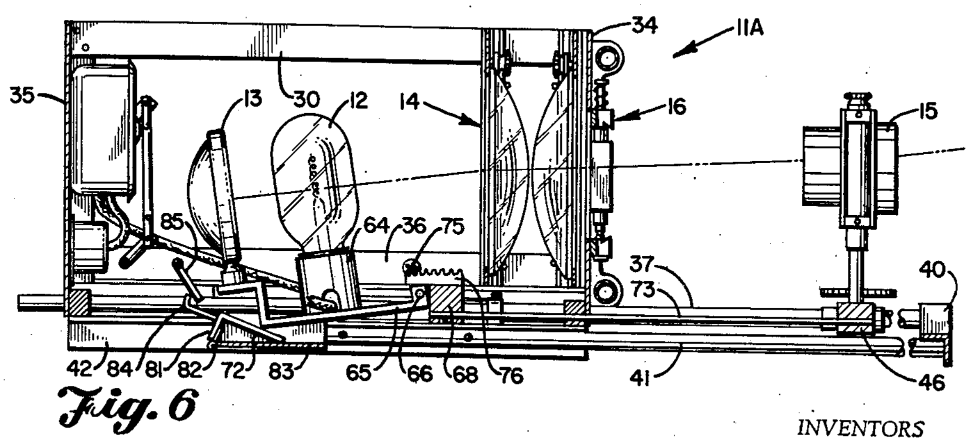
FIG. 6 is another view similar to that of FIG. 4, but showing the projector unit in a different adjusted position.
Figure 11:
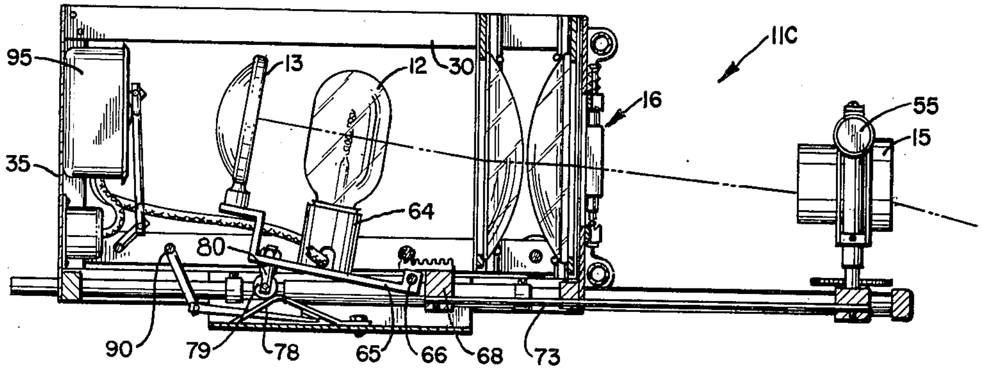
FIG. 11 is a view similar to that of FIG. 10, but showing the top projector unit in another adjusted position.

It will be apparent that, in operating the apparatus 10, the mounting structure for the objective lens assembly of the middle projector unit 11B will be vertically adjusted so that the optical axis of the objective lens assembly is aligned with the optical axis of the related condenser lens assembly 14, while the objective lens assemblies 15 of the bottom and top units 11A and 11C, respectively, are vertically adjusted so that their optical axes are respectively above and below the optical axes of the related condenser lens assemblies, as shown in FIG. 1 and in FIGS. 6 and 11, respectively. Further, the knobs 55 of the mounting structures for the objective lens assemblies of the bottom and top projector units are manipulated so that the projection axes of the bottom and top units will be laterally adjusted to intersect the plane of the screen 17 at the same point as the projection axis of the middle projector unit.

In order to ensure that a maximum amount of light is available for projection along a secondary axis of the optical system in each of the top and bottom projector units, the light source 12 is not only vertically movable, as previously described, but is also preferably mounted, along with its associated reflector 13, for swinging about a horizontal, laterally extending axis so that, when the light source 12 is depressed relative to the optical axis of the condenser lens assembly 14, as in the bottom unit 11A of FIG. 6, or when the light source 12 is raised with respect to the optical axis of its related condenser lens assembly, as in the top projector unit 11C of FIG. 11, the light source and reflector are correspondingly tilted or inclined to direct the optical axis of the reflector substantially at the center of the condenser lens assembly.

The desired pivotal mounting of the light source 12 and reflector 13 is achieved by securing both the socket 64 receiving the light source 12 and the reflector 13 to a bracket 65 which is pivoted, at its front end, on a pin 66 (FIG. 4) which extends laterally and is carried by lugs 67 projecting rearwardly from a cross member 68 having tubular bearings 69, at its opposite ends, slidable on guide rods 37 between stop collars 70 and 71.

Further, in accordance with the invention, pivoting of the bracket 65 in each of the bottom and top projector units 11A and 11C is preferably dependent upon the axial displacement of the corresponding objective lens assembly 15 during focusing of the projected image on the screen 17. Since the axial position of the objective lens assembly 15 for the focused condition depends upon the distance between the projection apparatus 10 and the screen 17, and since the degree of divergence from the primary axis of the secondary axis along which the bottom and top projector units project will decrease with an increasing distance between the projection apparatus 10 and the screen 17, it is apparent that the tilting or pivoting of the brackets 65 of the bottom and top projector units can be effected automatically in reponse to the focusing movement of the related objective lens assemblies 15, thereby to permit the focusing of the projector units and the necessary vertical displacements of their light sources and reflectors by convenient manipulation of a single control.

Referring now to FIG. 6, it will be seen that tilting of the bracket 65 in the bottom projector unit 11A is effected by a cam member 72 which, in its normal operative position of FIG. 6, defines a downwardly and forwardly inclined plane slidably engaged by a back end portion of bracket 65 so that, as the cross member 68 moves forwardly along guide rods 37, bracket 65 tilts downwardly about the pivot pin 66, whereas, when the cross member 68 moves rearwardly along the guide rods, bracket 65 is elevated to a final position where the optical axis of the light source 12 and reflector 13 coincides with the optical axis of the related condenser lens assembly 14. In order to make the vertical and tilting movements of the light source 12 and reflector 13 dependent upon the axial focusing movements of the related objective lens assembly 15, a connecting rod 73 (FIGS. 6 and 7) is secured, at its opposite ends, in the cross member 68 of the mounting structure for the light source and reflector and in the cross member 46 of the mounting structure for the objective lens assembly.

The simultaneous control of the focusing movement of the objective lens assembly and of the tilting and vertical movements of the light source and reflector is achieved by providing a laterally extending shaft 74 which is rotatably journalled, at its opposite ends, in the frame members 36, and which has toothed portions defining pinions 75 meshing with gear racks 76 fixed to the cross member 68. Thus, when shaft 74 is rotated, by means of one or the other of the knobs 77 fixed on its opposite ends (FIGS. 3 and 7), the cross members 68 and 46 are displaced, as a unit, along the guide rods 37 to produce the desired axial focusing movement of the objective lens assembly 15 and also to slide the bracket 65 along the inclined plane of the cam member 72 for tilting and vertically displacing the light source 12 and reflector 13.

As is apparent in FIG. 6, the light source 12 and reflector 13 of the bottom projector unit 11A move downwardly and tilt upwardly in the forward direction in response to forward movement of cross member 68 with the related objective lens assembly 15. On the other hand, it is necessary that the light source 12 and reflector 13 of the top projector unit 11C move and tilt in the opposite directions in response to forward movement of the related objective lens assembly. Thus, as shown in FIGS. 10 and 11, the top projector unit 11C has a cam member 78 defining an upwardly and forwardly inclined surface which, in the normal operative position of the cam member 78, is engaged by a roller 79 rotatably mounted in a bracket 80 depending from bracket 65 so that, as the cross member 68 is moved forwardly with the related objective lens assembly 15, the light source and reflector are raised and tilted downwardly and forwardly (FIG. 11).

Since it is desirable to provide the projector units 11A, 11B and 11C in the form of separable entities so that they can be used individually as conventional projectors, as previously indicated, the cam members 72 and 78 of the bottom and top units are preferably arranged for movement to inoperative positions in which the related light sources and reflectors are maintained on the primary axes of the optical systems even while moving axially with the objective lens assemblies during focusing of the projectors. The ability to render the cam members 72 and 78 inoperative to effect vertical and tilting movements of the related light sources and reflectors further makes it possible to employ as the middle unit 11B a projector unit which is identical with either the top or bottom units. Thus, in the illustrated projection apparatus 10, the middle projector unit 11B is the same as the top projector unit 11C, but with its cam member 78 being moved to an inoperative position, as hereinafter described in detail.

As shown in FIG. 6, the cam member 72 has a depending leg 81 at its back end which is connected, by a hinge 82 to a support plate 83 (FIGS. 6 and 7) which extends laterally between the frame members 31 and is secured to the latter. Further, an arm 84 extends rearwardly from cam member 72 and is engageable by a latch 85 which extends generally downward from a shaft 86 which is journalled, at its opposite ends, in the frame members 36. When the latch 85 is directed vertically, as in FIGS. 4 and 5, the lower end of the latch bears downwardly against the arm 84 to hold the cam member 72 in the illustrated horizontal position so that the light source 12 and reflector 13 of the bottom unit are maintained in line with the primary axis of the optical system during movement of the bracket 65 along the cam member 72 from the position of FIG. 4 to the position of FIG. 5. However, when the latch 85 is rocked, by turning of the shaft 86, to the inclined position of FIG. 6, the latch 85 releases the arm 84 and thereby permits the cam member 72 to assume its inclined operative position. The shaft 86 may be manipulated from either side of the bottom unit 11A by knobs 87 (FIGS. 3 and 7) secured to the opposite ends of shaft 86.

Figure 8:
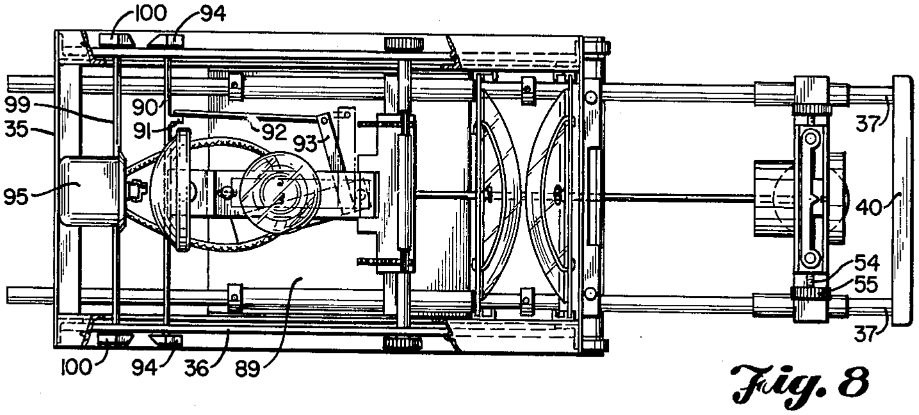
FIG. 8 is a top plan view of the middle projector unit of the apparatus of FIG. 3.
Figure 7:
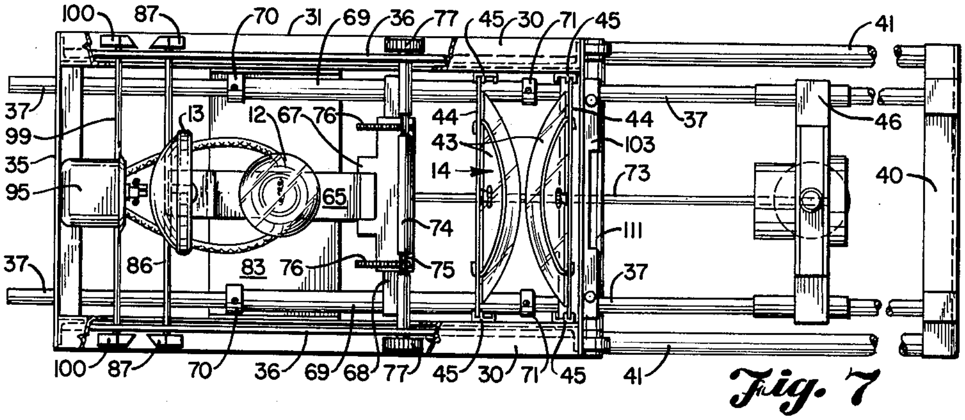
FIG. 7 is a top plan view of the bottom projector unit of FIGS. 4, 5 and 6.
Figure 13:
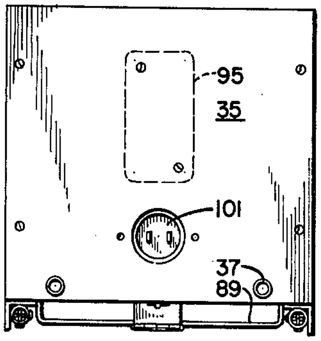
FIG. 13 is a rear elevational view of one of the projector units included in the apparatus of FIG. 3.
Figure 10:
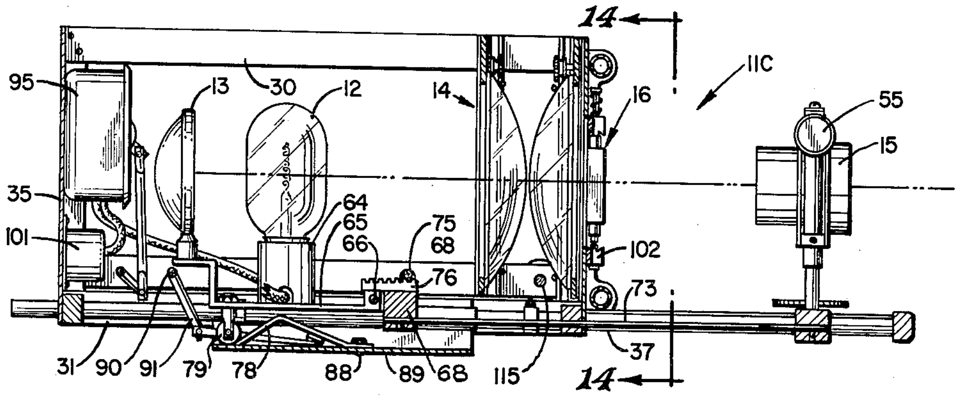
FIG. 10 is a longitudinal sectional view, similar to that of FIG. 4, but showing the top projector unit of the apparatus of FIG. 3.
Figure 9:
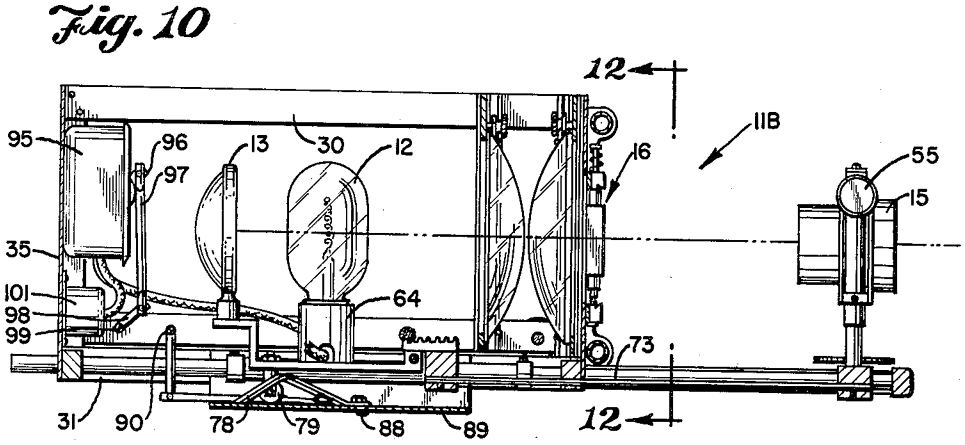
FIG. 9 is a longitudinal sectional view similar to that of FIG. 4, but showing the middle projector unit of FIG. 8.

As shown in FIGS. 8 and 9 and in FIGS. 10 and 11, the cam member 78 of each of the middle and top units 11B and 11C is pivotally mounted, by a screw 88 on a plate 89 which extends between the bottom frame members 31 and is secured to the latter so that the cam member 78 can swing, about a vertical axis defined by the screw 88, between a central position (FIGS. 10 and 11) where it is engageable by the roller 79, and a laterally deflected, inoperative position (FIGS. 8 and 9) where it is disposed to one side of the roller 79 which merely rides upon the horizontal surface of the plate 89. Thus, when the projector units 11A, 11B and 11C are vertically stacked, as in FIG. 3, to form the projection apparatus 10, the cam member 78 of the middle unit 11B is disposed in its inoperative position, thereby to maintain its light source and reflector in alignment with the primary axis of the optical system during focusing movement of the related objective lens assembly, whereas the cam member 78 of the top projector unit 11C is disposed in its operative position in order to effect the desired vertical and tilting movements of the light source and reflector thereof in response to focusing movement of the related objective lens assembly.

In order to cause manipulation of the cam member 78 between its operative and inoperative positions, each of the middle and top units 11B and 11C includes a laterally extending shaft 90 which is rotatably journalled, at its opposite ends, in the frame members 36 and which has a downwardly extending radial arm 91 pivotally connected, by a link 92, to an arm 93 extending laterally from the cam member 78 so that the latter is angularly displaced about the vertical axis defined by its mounting screw 88 in response to turning of the shaft 90 about its horizontal axis. Knobs 94 are secured on the opposite ends of shaft 90 (FIGS. 3 and 9) in order to permit turning of the shaft from either side of the projection apparatus.

It is further to be noted that the plates 89 of the middle and top projector units extend below the bottom edges of the sides of the related housings (FIGS. 8, 10, 12 and 13), so that the plate 89 of the top unit 11C is received between the frame members 30 at the top of the middle unit 11B, for locating the top unit relative to the middle unit, while the plate 89 of the middle unit similarly fits between the frame members 30 at the top of the bottom unit 11A, thereby to locate the middle unit with respect to the bottom unit.

The controls for each of the projector units further include a switch 95 mounted against the front surface of the related back wall 35 and having an actuating arm 96 which is pivotally connected, by a link 97 to a radial arm 98 extending from a lateral shaft 99 which is rotatably mounted, at its opposite ends, in the side frame members 36 of the related projector unit. Knobs 100 are fixed on the opposite ends of each shaft 99 so that the latter may be manually turned, from either side of the projection apparatus 10 in order to open or close the contacts of the switch 95 which is interposed in the electrical energizing circuit of the associated light source 12. Further, a receptacle 101 (FIGS. 4, 8, 10 and 13) is mounted in the back wall 35 of each projector unit and is connected by suitable wiring to the related switch 95 so that the electric circuit for the light source 12 can be connected to a suitable electrical source by way of the receptacle 101.

In the illustrated apparatus 10 for projecting multiple, superposed images, the carriers 16 of the projector units 11A, 11B and 11C are all identical, but two of the carriers 16 are mounted for turning about the optical axis of the related condenser lens assembly 14, whereas the other carrier may be fixed so as to permit the accurate alignment of the images projected by the units having the rotatable carriers with respect to the image projected by the remaining projector unit, that is, the unit having a non-rotatable carrier.

Figure 12:
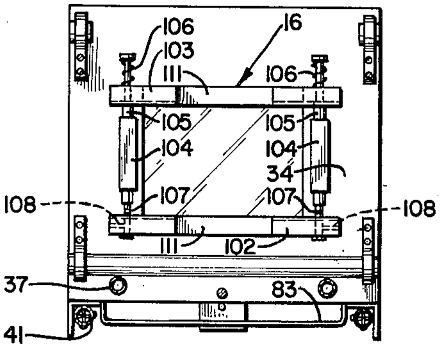
FIG. 12 is a transverse sectional view taken along the line 12—12 of FIG. 8.

Referring to FIG. 12, it will be seen that the non-rotatable carrier 16 may include a bottom cross piece 102 suitably secured to the front face of the front wall 34 of the related projector unit and extending along the lower margin of an opening formed in that front wall. A top cross piece 103 is slidably mounted, adjacent its opposite ends, on reduced diameter upper portions of pins 104 and is urged downwardly with respect to the latter to rest against enlarged portions 105 of the pins by means of springs 106. The lower end portions of the pins 104 are slidably received in vertical bores formed adjacent the ends of the lower cross piece 102, and the lower portions of the pins 104 are further formed with two or more axially spaced apart, circumferential grooves 107 selectively engageable by detents 108 (appearing in broken lines in FIG. 12) so that the distance between the cross pieces 102 and 103 may be adjusted for accommodating different sized transparencies or slides therebetween. As shown in FIG. 4, the upper and lower surfaces of the cross pieces 102 and 103, respectively, have longitudinal grooves 109 and 110 formed therein for accommodating the bottom and top edges of a slide or transparency to be supported by the carrier. Preferably, the front surfaces of the cross pieces 102 and 103 are centrally cut out, as at 111 (FIGS. 7 and 12), thereby to expose the opposite edges of the slide gripped between the cross pieces for facilitating the insertion and removal of the slide.

Figures 14, 15:
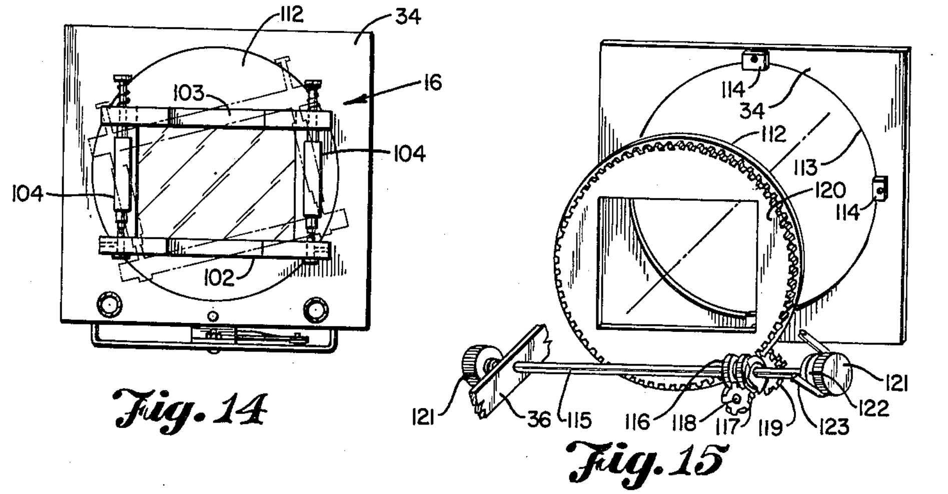
FIG. 14 is a transverse sectional view taken along the line 14—14 of FIG. 10.
FIG. 15 is an exploded perspective view showing the parts of an arrangement included in the top projector unit for rotating a transparency accommodated therein.

In the case of the projector units having carriers 16 which are rotatable about the optical axes of the related condenser lens assemblies, the lower cross piece 102 of each carrier 16 is secured to the front surface of a disc 112 (FIGS. 14 and 15) which is rotatable in a circular opening 113 formed in the front wall 34 of the related projector unit. The edge of the wall 34 defining the circular opening 113 and the corresponding edge of the disc 112 may be frusto-conical or stepped in order to prevent axial displacement of the disc 112 forwardly through the opening 113, while rearward withdrawal of the disc 112 from the opening 113 may be prevented by clips 114 (FIG. 15) removably secured to wall 34 and overlying the peripheral portion of the back surface of disc 112. Thus, the carrier 16 is rotatable with the disc 112 in relation to the front wall 34 for either aligning the slide or transparency mounted in such rotatable carrier with respect to the slide or transparency in the fixed carrier, or to achieve special effects by relative tilting or rotation of the respective transparencies.

In order to provide for turning or rotation of each carrier 16 mounted on a rotatable disc 112, the related projector unit further includes a laterally extending shaft 115 (FIG. 15) which is rotatably journalled, adjacent its opposite ends, in the frame members 36, and which carries a worm 116 meshing with a worm gear 117 mounted on an idler shaft 118 which also carries a spur gear 119 meshing with gear teeth 120 formed on the periphery of the related disc 112. Thus, the disc 112 and the carrier 16 mounted thereon are rotated in response to turning of the shaft 115, and the latter is provided with knobs 121 (FIGS. 3 and 15) to permit manual rotation of the shaft 115 from each of the opposite sides of the projection apparatus 10.

Where it is desired to obtain effects requiring the continuous rotation of the slide or transparency supported in one of the carriers 16, for example, in the carrier of the top projector unit 11C, a belt pulley 122 may also be secured on the related shaft 115 and engaged by a belt 123 which is driven by a pulley 124 (FIG. 1) on the output shaft 125 of a speed reducing assembly 126 driven by an electric motor 127 which is suitably mounted on top of the housing of unit 11C. Further, if desired, one end of the shaft 128 of motor 127 may extend forwardly beyond the carrier 16 of the top unit 11C and carry a transparency disc 129 which has a suitable diameter so that the peripheral portion of the rotated disc 129 will project in front of the carrier 16 of the top unit for cooperation with the transparency mounted in that carrier 16 for producing unique moving images or effects.

Figure 2:
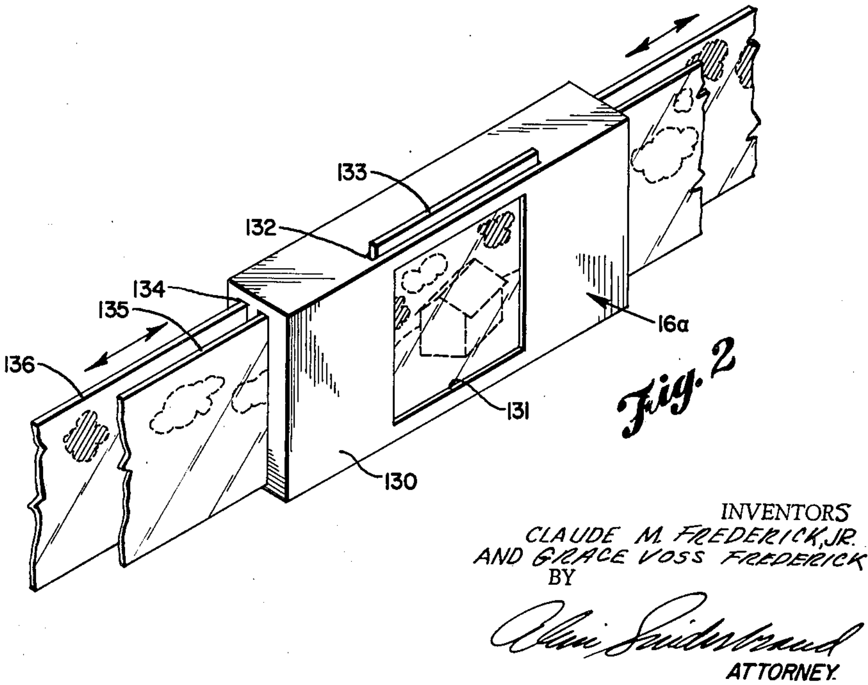
FIG. 2 is a perspective view of a device that may be provided on each of the projectors of the apparatus of FIG. 1 in order to support movable transparencies.
Figure 3:
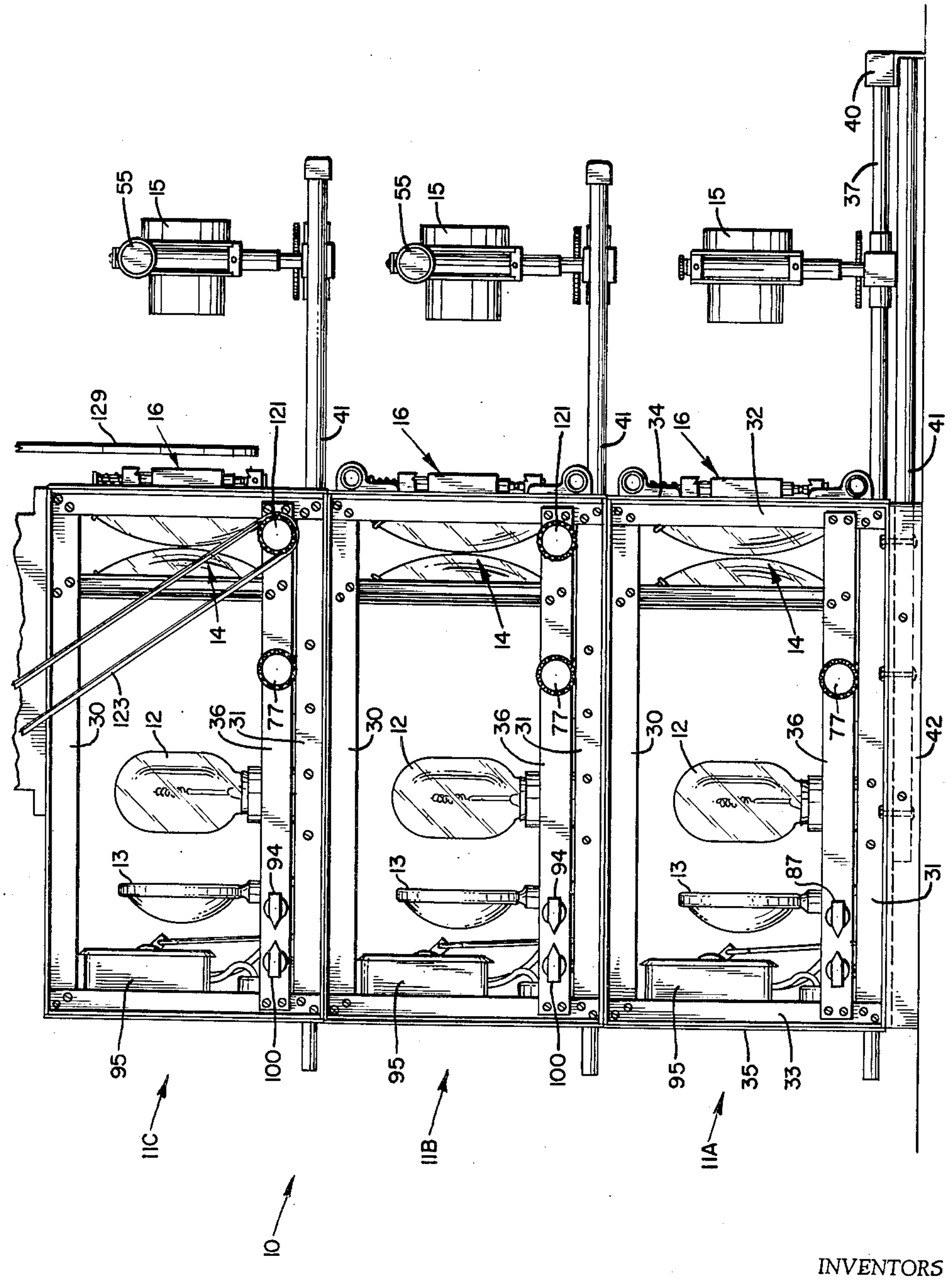
FIG. 3 is a side elevational view of the projecting apparatus of FIG. 1, but with the sides of the housings of the several projectors removed in order to expose the internal elements thereof.

Although the previously described carriers 16 are each intended to removably support a single slide or transparency, it is to be noted that the projection apparatus 10 may be employed in connection with many different types of slide or film carriers capable of handling a number of slides, film strips, or motion picture film. By way of further example, reference is now made to FIG. 2 of the drawings, wherein another type of transparency carrier suitable for use in connection with one or more of the projector units of the apparatus 10 is diagrammatically illustrated. The carrier 16A of FIG. 2 may simply include a box-like housing 130 which is suitably secured to the front wall 34 (not shown in FIG. 2) of the housing of the related projector unit and which has a suitably shaped opening 131 in its front wall, and a similar opening (not shown) in its rear wall. Further, a slot 132 is formed in the top of housing 130 to conveniently receive a slide or transparency 133 which is to be retained in a fixed position between the condenser and objective lens assemblies of the related projector unit. The opposite end walls of housing 130 are also formed with one or more slots 134 so that strip film or series of connected slides or transparencies 135 and 136 may be slidably passed through the housing 130 in order to provide a projected image combining the subject matter of the fixed slide 133 and the relatively movable subject matter of the film strips or slides 135 and 136.

From the above it will be apparent that the present invention provides an apparatus for projecting multiple, superposed images in a convenient fashion while avoiding any distortion of such images as in previously existing devices intended for the same purpose. Further, the particular apparatus 10 described above and illustrated in the accompanying drawings embodies structural features which facilitates the operation of the apparatus in order to obtain the distortion free projection of the multiple, superposed images, and such apparatus is conveniently made up of a number of units which can be individually employed as conventional slide projectors.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. An apparatus for projecting multiple, superposed images comprising a plurality of optical systems each including a light source with an associated reflector, condenser, and objective lens assemblies and carrier means for supporting at least one transparency in the path of the light between said condenser and objective lens assemblies so that each optical system is operative to project an image of the transparency in the related carrier means, said condenser and objective lens assemblies all having parallel optical axes, means supporting the objective lens assembly of each optical system for movement along its optical axis toward and away from the respective condenser lens assembly, thereby to adjust the focus of the optical system, means operative to displace the objective lens assembly of at least one of said optical systems relative to the respective condenser lens assembly to space the optical axis of said displaced objective lens assembly from the optical axis of said respective condenser lens assembly in the direction toward another of said optical systems so that said one optical system projects along an axis which is inclined relative to said optical axes and intersects the projection axis of said other optical system at the focus of said optical systems, thereby to avoid distortion of the multiple, superposed images projected in a plane passing through said focus perpendicular to said optical axes, and means operative in response to focussing movement of said objective lens assembly parallel to its optical axis to bodily and angularly displace said light source and associated reflector of said one optical system relative to said optical axis of the respective condenser lens assembly for aiming the light from said source and reflector in the direction for filling the pupil of the related objective lens assembly with light when the latter is displaced to project along said inclined axis, thereby ensuring bright illumination of the image projected along said inclined axis.

2. An apparatus for projecting multiple, superposed images against a vertical screen comprising a plurality of vertically superposed optical systems each including a light source with an associated reflector, condenser and objective lens assemblies having horizontal optical axes and a focus at the vertical plane of the screen and carrier means for supporting at least one vertical transparency in the path of the light between said condenser and objective lens assemblies so that each optical system is operative to project an image of the transparency in the related carrier means, means operative to vertically displace the objective lens assembly of at least one of said optical systems relative to the respective condenser lens assembly so that the displaced objective lens assembly has its optical axis spaced vertically from the optical axis of said respective condenser lens assembly in the direction toward another of said optical systems to cause said one optical system to project along an inclined axis which intersects the projection axis of said other optical system at the focus of said optical systems, thereby to avoid distortion of the multiple, superposed images projected on the screen, means mounting each objective lens assembly for horizontal movement parallel to its optical axis, thereby to adjust the focus of the related optical system, and means operative in response to the horizontal focussing movement of the related objective lens assembly to vertically displace and tilt the light source and associated reflector of said one optical system relative to the optical axis of said respective condenser lens assembly for aiming the light from said source and reflector in the direction for filling the pupil of the vertically displaced objective lens assembly with light, thereby ensuring bright illumination of the image projected along said inclined axis.

3. Apparatus as in claim 2, wherein said plurality of optical systems consists of bottom, middle and top optical systems, with said middle optical system having its condenser and objective lens assemblies arranged with their optical axes in axial alignment to project therealong; and wherein the objective lens assemblies of said bottom and top optical systems have their optical axes spaced upwardly and downwardly, respectively, in relation to the optical axes of the corresponding condenser lens assemblies, with the light sources and associated reflectors of said bottom and top optical systems being respectively lowered and tilted upwardly, and raised and tilted downwardly with respect to the optical axes of the corresponding condenser lens assemblies.

4. Apparatus as in claim 3; further comprising support means for each light source and associated reflector movable horizontally with the related objective lens assembly and a bracket carrying each light source and associated reflector and being pivotally mounted on said support means therefor to swing about a horizontal axis extending transversely with respect to the direction of the horizontal movement of said support means; and wherein said means operative to vertically displace and tilt the light source and reflector of each of said bottom and top optical systems includes a normally stationary cam member having an inclined surface cooperating with a part on said bracket carrying the related light source and reflector to dispose the latter in alignment with the optical axis of the coresponding condenser lens assembly when the related optical system is focused at infinity and to increasingly pivot said bracket as the focus is shortened.

5. Apparatus as in claim 4; wherein said optical systems are embodied in vertically stacked, separable projector units, and said middle optical system also has a normally stationary cam member with an inclined surface cooperating with a part of the related bracket; and further comprising means for moving each cam member from an operative position to an inoperative position where said support means for the related light source and reflector can move with the corresponding objective lens assembly while the light source and reflector remain aligned with the optical axis of the condenser lens assembly for projection along the aligned axes of the condenser and objective lens assemblies of the optical system, so that said cam member of the middle optical system is normally maintained in said inoperative position and the cam members of the bottom and top optical systems can also be disposed in their inoperative positions upon separation of said projector units for individual use of the latter.

6. Apparatus as in claim 3; further comprising means for adjusting the objective lens assembly of at least two of said optical systems relative to the corresponding condenser lens assembly in directions extending transversely with respect to the optical axis of the latter, thereby to laterally register the projection axes of the optical systems at the point of intersection therebetween.

7. Apparatus as in claim 6; wherein said carrier means of at least two of said optical systems includes a structure for holding a transparency, and means mounting said structure for rotation about the axis of the related condenser lens assembly, so that the images projected by all of said optical systems can be angularly registered.

8. Apparatus as in claim 3; wherein said optical systems are embodied in vertically stacked, separable projector units each including a housing having guide rods extending parallel to the axes of the related condenser and objective lens assemblies and projecting forwardly from the housing; and further comprising means mounting each objective lens assembly on said guide rods to slide along the latter in front of the related housing, means mounting each condenser lens assembly in the related housing, means mounting each carrier means in front of the related housing, means mounting each light source and the associated reflector on said guide rods to slide along the latter within the related housing behind the condenser lens assembly, and a connecting member between the mounting means for each objective lens assembly and the mounting means of the related light source and reflector so that said objective lens assembly and said related light source and reflector are movable together along said guide rods; said means operative to vertically displace and tilt the light source and reflector including normally stationary cam means mounted in said housing of at least each of the projector units embodying said bottom and top optical systems and cooperating with the mounting means of the related light source and reflector to control the raising and lowering and the tilting thereof in response to the movement of the objective lens assembly along the guide rods.

9. Apparatus as in claim 8; wherein said means mounting the carrier means in front of the related housing in at least two of said projector units includes a circular plate rotatable on the housing about an axis which is coaxial with respect to the optical axis of the related condenser lens assembly, thereby to permit angular alignment of the images projected by said optical systems.

10. Apparatus as in claim 9; further comprising powered means for rotating said circular plate of one of the projector units so that the image of the transparency in the related carrier means is continuously rotated.

11. In an apparatus for projecting multiple, superposed images against a screen; a portable projector unit comprising a housing, guide means extending along said housing and projecting forwardly from the latter, a condenser lens assembly mounted in said housing with its optical axis parallel to said guide means, an objective lens assembly having its optical axis parallel to that of said condenser lens assembly, mounting means for said objective lens assembly slidable on said guide means in front of said housing for focusing movement of the objective lens assembly and including means for displacing said objective lens assembly in directions perpendicular to the optical axis of the latter so that said optical axis of the objective lens assembly can be offset relative to the optical axis of the condenser lens assembly, a light source in said housing in back of said condenser lens assembly, a reflector in back of said light source, mounting means for said light source and reflector slidable along said guide means and pivotable about an axis extending transversely with respect to said guide means, a cam member movable between an operative position, where an inclined surface thereof is engageable by said mounting means of the light source and reflector to pivot such mounting means in response to movement of the latter along said guide means, and an inoperative position where said mounting means of the light source and reflector maintains a predetermined attitude during movement along said guide means, means for displacing said cam member between said operative and inoperative positions, and means coupling together said mounting means for the objective lens assembly and for said light source and reflector, respectively, so that both mounting means are movable jointly along said guide means.

12. In an apparatus for projecting multiple, superposed images against a screen; a portable projector unit as in claim 11, wherein said surface of the cam member is inclined downwardly and forwardly with respect to said guide means when said cam member is in said operative position, and said surface extends parallel to said guide means when said cam member is in said inoperative position.

13. In an apparatus for projecting multiple, superposed images against a screen; a portable projector unit as in claim 11, wherein said housing includes a lateral plate at the bottom thereof extending parallel to said guide means and said cam member is pivoted on said plate to swing about an axis perpendicular to the latter between said operative and inoperative positions, said inclined surface of the cam member sloping upwardly and forwardly from said plate, and said mounting means for the light source and reflector including a depending cam follower riding on said inclined surface when said cam member is in said operative position and riding on said plate when said cam member is swung to said inoperative position.

References Cited in the file of this patent

UNITED STATES PATENTS

| | | |
|---|---|---|
| 1,199,460 | Featherstone | Sept. 26, 1916 |
| 1,579,880 | Meissner et al. | Apr. 6, 1926 |
| 1,666,304 | Proctor | Apr. 17, 1928 |
| 1,766,102 | Brenkert et al. | June 24, 1930 |
| 1,806,452 | Fulgora | May 19, 1931 |
| 1,952,522 | Warmisham | Mar. 27, 1934 |
| 2,200,358 | Haskin | May 14, 1940 |
| 2,334,962 | Seitz | Nov. 23, 1943 |
| 2,600,261 | Pennington | June 10, 1952 |
| 2,878,718 | Post | Mar. 24, 1959 |